July 1, 1969 C. R. KLINE, JR 3,452,800
TIRE AND ITS MANUFACTURE
Filed March 27, 1967

INVENTOR.
CRANDALL R. KLINE, JR.
BY
ATTORNEY

United States Patent Office 3,452,800
Patented July 1, 1969

3,452,800
TIRE AND ITS MANUFACTURE
Crandall R. Kline, Jr., Akron, Ohio, assignor to The Goodyear Tire & Rubber Company, Akron, Ohio, a corporation of Ohio
Continuation of application Ser. No. 330,314, Dec. 13, 1963. This application Mar. 27, 1967, Ser. No. 626,262
Int. Cl. B60c 9/02, 5/02
U.S. Cl. 152—356                                 9 Claims

ABSTRACT OF THE DISCLOSURE

Rubber will extrude through the spaces at the tread and shoulders of the carcass of a pneumatic tire made of giant cords, when the tire is inflated for curing. This is prevented by providing a retainer formed of smaller cords inside of the ply or plies of larger cords and, if desired, between plies of giant cords or both between plies of giant cords and inside of the inner ply of giant cords. The tire is then cured in a mold with an airbag or bladder in the usual manner.

---

This application is a continuation of my application Ser. No. 330,314 filed Dec. 13, 1963 and now abandoned.

This invention relates to a green tire made with bias cut plies composed of at least one giant cord ply, and to both the curing of such a tire and the cured tire.

The cord in the carcass plies of a tire are covered with rubber, as by calendering, and often rubber cushions are provided adjacent to one or both surfaces of a ply.

The cords in the respective plies are very close to one another and may even be tightly compressed against one another at the beads, and are also very close to one another in the side walls of the tire. On the other hand, in in the shoulder portions of the shaped tire, the distance between the cords is greater and there are spaces of substantial width, being almost as wide as the cords themselves, in some situations. When larger cords are used the spaces are of greater width than when smaller cords are used, and this is primarily a function of the original cord count. The width of the spaces between the cords depends not only upon the size of the cords and the original cord count, but also upon the size and shape of the tire, the ply angles, and the original circumferential length of the carcass plies.

This invention relates to the manufacture of tires in which spaces between the carcass cords in the tread portion of the completed and shaped tire measure as much as .04 inch or more. This is equal to the spacing developed when a ply of cords, each of .05 inch in diameter, is pantographed sufficiently to space the cords at least about 80 percent of their diameter.

When a tire formed with spaces this wide or wider in its shoulder portions is placed under pressure in a mold, and is heated for curing, the rubber is extruded outwardly through these spaces. If such extrusion occurs through the spaces between the cords of the first or inner ply, these cords are brought nearer to the inner surface of the completed tire, so that this surface becomes somewhat corrugated in the tread portion of the tire. This is considered objectionable from the customer standpoint, and the tires are not considered as desirable as those with the smooth inner surface to which the public has become accustomed. If the extrusion occurs in the spaces between the cords of the second ply (or some succeeding ply if more than two plies are used) the rubber which is intended to separate the plies is extruded from between the plies and the plies are brought objectionably close together.

According to this invention, such extrusion of rubber through the spaces between giant cords in the tread portion of the carcass of a tire is overcome by providing one or more fabric retainers inside of the inner ply of the tire in the tread portion, which retainer contains cords so small and so numerous that the spaces between them in the tread portion are not of sufficient size, i.e. no more than .03 inch, to permit any substantial amount of rubber to be extruded through them. Likewise, one or more such fabric retainers may be provided between the various carcass plies to maintain a cushion of rubber between them. The retainers are bias cut, and usually two retainers are used in the tire to give a balanced structure.

If a retainer of smaller cords is located between two plies of large cords, and all of the rubber is extruded outwardly from between the retainer and the next outer ply, this retainer is brought into contact with this ply, but this is not as objectionable as having two plies of larger cords brought into contact. The contact points where the cords cross are smaller (although they are more numerous), and the smaller cords are more flexible and therefore more able to withstand distortion without causing separation at the contact points.

By "giant cords," we refer generally to cords that are substantially .05 inch in diameter, or larger, but we are more specifically interested in tires with cords (of any size) so large that in the shoulder portion of the tire, where the spacing is greatest, there is a space of at least .04 inch between them. The retainers of this invention are most advantageously used in tires constructed of large cords which have a high blow-up ratio and high ply rating. The large cords may be formed of cotton, nylon, rayon, polyester or other cord material. The smaller cords in the fabric retainer also may be cotton, nylon, rayon, polyester or other cord material. The cords in the retainer may be of the same composition as the large cords or they may be of a different composition. They are of so much smaller diameter and so much more numerous that the spaces between them at the shoulders of the tire are so small as to prevent any substantial extrusion of rubber through them. Usually these cords will be less than .04 inch in diameter, but this will depend upon the size and shape of the tire.

Using large cords, ordinarily only two carcass plies are required in the smaller tires. The fabric retainers work equaly well in tires in which there are many plies in the carcass.

A fabric retainer need cover only the tread portion of the tire, and down over the shoulders, where the pantographed cords are spaced farthest from one another. It usually extends to the toes of the tire and may extend under the beads.

The fabric retainer and the giant cords in the carcass plies are covered with rubber by calendering or any other usual procedure.

The invention will be further described in connection with the accompanying drawings, in which—

Figure 1:
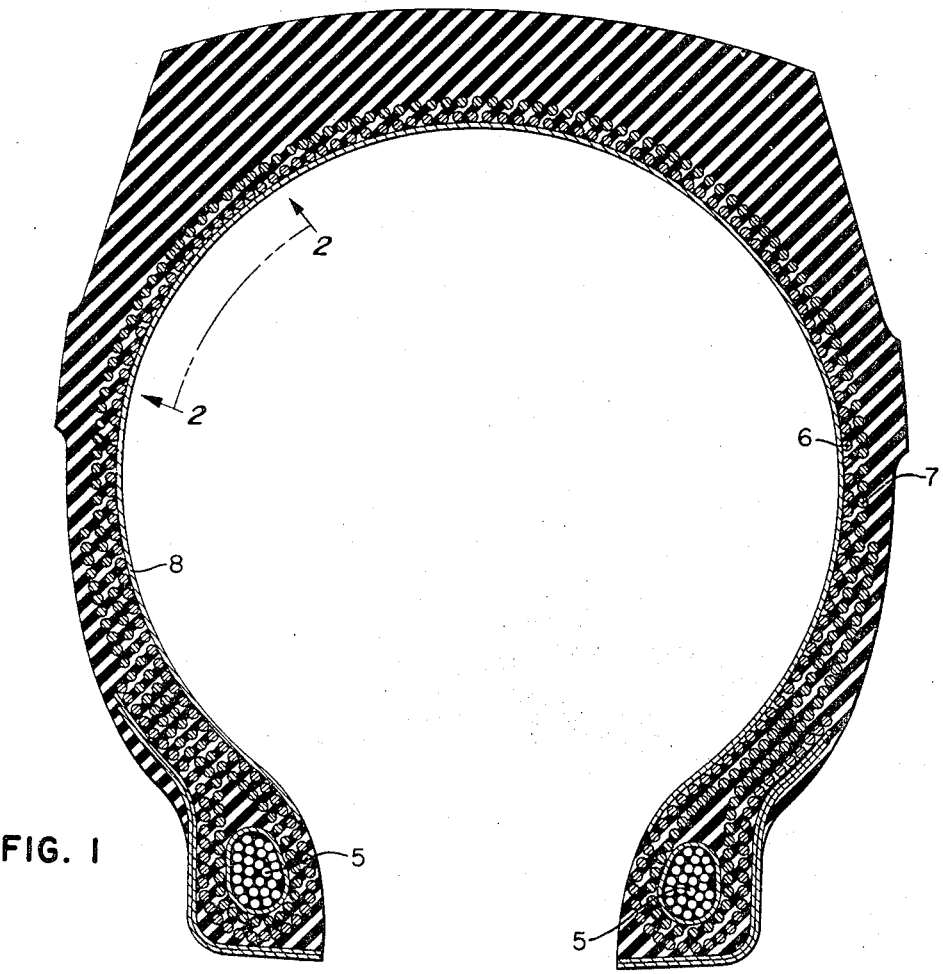
FIGURE 1 is a section through a tire formed of biascut plies, in which a fabric retainer is used as a liner.

In the drawings, FIGURE 1 is illustrative of a tire of any usual construction, and shows more particularly a tire with single beads 5, an inner ply 6, and an outer ply 7. The plies 6 and 7 are bias plies made up of giant cords, the cords in the different plies being criss-crossed. The giant cords in each ply are substantially .05 inch in diameter or larger.

Figure 2:
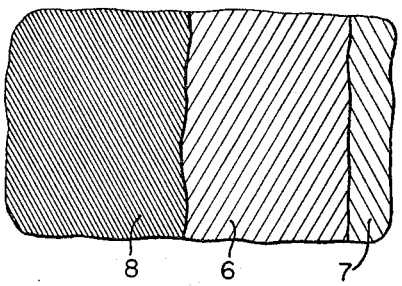
FIGURE 2 is a section on the line 2—2 of FIGURE 1 with a portion of the liner broken away to show that in this preferred type of structure the cords of the fabric retainer cross the cords of the inner ply.

The retainer or liner 8 is made of cords .04 inch in diameter or smaller. The spaces between the cords of smaller diameter in the shoulder portions of the tire are no greater than .03 inch and are not sufficiently wide to permit any substantial extrusion of the rubber through them. As illustrated in FIGURE 2, if the plies 6 and 7 are bias plies, the cords in the fabric retainer 8 adjacent the ply 6 are preferably parallel to the cords in the ply 7, although alternatively they may be parallel to the cords in the ply 6. Two or more fabric retainers may be used, although generally a single retainer is sufficient under each ply.

When the green tire has been assembled and placed in a mold, and then is heated and inflated to any usual pressure prior to cure, by inflation of an impervious elastomeric member which covers the inner surface of the tire, so that the outer surface of the tire is brought into pressure contact with the mold surface, the fabric retainer 8 keeps the rubber in place on the inner surface of the tire and, if the tire is a tubeless tire, the usual rubber liner is kept intact inside of the inner ply. Thus the usual amount of rubber is maintained inside of the fabric on the inner surface of the tire. If the fabric retainer 8 were not there, during the inflation and cure of the tire in a mold some or perhaps most of this rubber in the tread portion of the tire would be extruded through the spaces between the giant cords of the inner ply 6, and perhaps also through the spaces between the giant cords of the outer ply 7. The inner surface of the tread portion of this tire, instead of being smooth, would be corrugated conforming generally to the fabric surface of the inner cord ply.

Figures 3, 4:
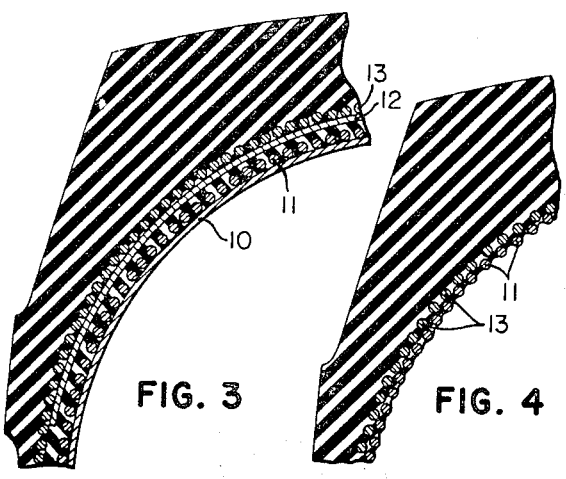
FIGURE 3 is a detailed section of the tread portion of a two-ply tire showing a fabric retainer used as a liner, and another fabric retainer used between the two plies each of which plies are composed of giant cords.
FIGURE 4 is a section showing two plies of giant cords brought together in the absence of a fabric retainer.

FIGURE 3 is a section of the tread portion of a tire of different design, and it is to be compared with the section of a tire shown in FIGURE 4. In the tire of FIGURE 3 there is a fabric retainer 10 inside of the inner ply of giant cords and a fabric retainer 12 between the plies 11 and 13 of giant cords. This retainer extends no further than the toes of the tire and may terminate in the sidewall areas. FIGURE 4 shows a tire in which the two plies 11 and 13 are not separated by any fabric retainer, but the rubber has been extruded between the spaces between the cords in the outer ply and the plies are in contact with one another. Such a tire has low resistance to separation between the plies during service. The inner surface of the tire is corrugated due to the extrusion of the rubber from the inner surface of the tire between the cords of the inner ply 11 and then between the cords of the second ply 13, in the shoulder and tread portions of the tire prior to and during the curing of the tire in a mold. The fabric retainers shown in FIGURE 3 prevent such extrusion.

The tire may be of any usual construction, using any fabric and any rubber composition except that it includes at least one ply of giant cords and one fabric retainer, as described, and it may be cured in any type of mold at any usual temperature and pressure. It is understood that the improved process does not depend upon the nature of the rubber compound used, or the temperature or pressure used during curing.

It has been found that the fabric retainers not only prevent extrusion of rubber while the tire is inflated for curing in a mold, but also prevent extrusion of the vulcanized rubber between the giant cords subsequently, after the cured tire which has been stretched during prolonged use, is inflated. In fact, the use of a retainer to prevent extrusion of rubber through the spaces between the cords in an inflated tire does not depend upon the tire being cured in a mold.

The invention is covered in the claims which follow. I claim:

1. A green pneumatic tire with a cord ply composed of giant cords the spaces between which in the shoulder portions of the shaped tire measure more than .04 inch across, and interiorly of this ply of giant cords a fabric retainer of cords in which the cords are so arranged that the spaces between them are sufficiently smaller than the aforesaid spaces to prevent substantial extrusion of rubber therethrough when the tire is cured.

2. The tire of claim 1 with beads, in which tire the retainer extends from bead to bead.

3. The tire of claim 1 in which there are two cord plies and there is a fabric retainer of small cords between said two plies as well as a fabric retainer interiorly of the inner of said two plies.

4. A cured pneumatic tire with a cord ply composed of giant cords the spaces between which in the shoulder portions of the tire measure more than .04 inch across, and interiorly of this ply of giant cords a fabric retainer of cords in which the cords are so arranged that the spaces between them are sufficiently smaller than the aforesaid spaces to prevent substantial extrusion of rubber therethrough.

5. A cured pneumatic tire with beads and a least one bias ply of giant cords which extends from bead to bead, the spaces between said cords in the shoulder portions of the tire being greater than .04 inch, and inside of this ply in at least said shoulder portions of the tire, a fabric retainer of smaller cords with the spaces between them at said shoulder portions being less than .03 inch so that no appreciable amount of rubber is extrudable therethrough.

6. The tire of claim 5 in which the fabric retainer extends from bead to bead.

7. The tire of claim 5 in which the ply of giant cords is the inmost ply and the retainer of smaller cords is between this ply and the inner surface of the tire.

8. The tire of claim 5 in which there are at least two cord plies in the carcass, the ply of giant cords is located exteriorly of the inmost ply and the retainer of smaller cords is located between said plies.

9. A shaped two-ply pneumatic tire, both plies being composed of giant cords, the tire having in its shoulder portions spaces between said giant cords large enough to permit the extrusion of rubber therethrough when the tire is inflated, and in said shoulder portions of the tire (1) a fabric retainer of smaller cords inside of the innermost of said giant plies and (2) a fabric retainer of smaller cords between said giant cords.

References Cited

UNITED STATES PATENTS

| 2,317,912 | 4/1943 | Howe | 152—356 |
| 3,244,216 | 4/1966 | Sprowl et al. | 152—356 |

ARTHUR L. LA POINT, *Primary Examiner.*

CHARLES B. LYON, *Assistant Examiner.*

U.S. Cl. X.R.

152—357

UNITED STATES PATENT OFFICE
CERTIFICATE OF CORRECTION

Patent No. 3,452,800                               July 1, 1969

Crandall R. Kline, Jr.

It is certified that error appears in the above identified patent and that said Letters Patent are hereby corrected as shown below:

Column 4, line 30, "a least" should read -- at least --; line 55, "cords", second occurrence, should read -- plies --.

Signed and sealed this 7th day of July 1970.

(SEAL)
Attest:

Edward M. Fletcher, Jr.                            WILLIAM E. SCHUYLER, JR.

Attesting Officer                                          Commissioner of Patents